(12) United States Patent
Kim et al.

(10) Patent No.: US 12,107,258 B2
(45) Date of Patent: Oct. 1, 2024

(54) CATHODE ACTIVE MATERIAL FOR LITHIUM SECONDARY BATTERY AND METHOD OF MANUFACTURING THE SAME

(71) Applicant: SK INNOVATION CO., LTD., Seoul (KR)

(72) Inventors: Sang Bok Kim, Daejeon (KR); Jik Soo Kim, Daejeon (KR); Hyo Shin Kwak, Daejeon (KR); Myoung Lae Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/960,600

(22) Filed: Oct. 5, 2022

(65) Prior Publication Data

US 2023/0089562 A1 Mar. 23, 2023

Related U.S. Application Data

(63) Continuation of application No. 16/692,895, filed on Nov. 22, 2019, now Pat. No. 11,502,291.

(30) Foreign Application Priority Data

Nov. 26, 2018 (KR) ........................ 10-2018-0147722

(51) Int. Cl.
*H01M 4/1391* (2010.01)
*H01M 4/04* (2006.01)
*H01M 4/36* (2006.01)
*H01M 4/485* (2010.01)
*H01M 4/505* (2010.01)
*H01M 4/525* (2010.01)
*H01M 4/62* (2006.01)
*H01M 4/02* (2006.01)
*H01M 10/0525* (2010.01)

(52) U.S. Cl.
CPC ....... *H01M 4/1391* (2013.01); *H01M 4/0471* (2013.01); *H01M 4/366* (2013.01); *H01M 4/485* (2013.01); *H01M 4/505* (2013.01); *H01M 4/525* (2013.01); *H01M 4/62* (2013.01); *H01M 4/628* (2013.01); *H01M 2004/021* (2013.01); *H01M 2004/028* (2013.01); *H01M 10/0525* (2013.01)

(58) Field of Classification Search
None
See application file for complete search history.

(56) References Cited

U.S. PATENT DOCUMENTS

2014/0154572 A1  6/2014  Singh et al.

FOREIGN PATENT DOCUMENTS

CN 110190254 * 8/2019
JP 2015181093 A 10/2015

OTHER PUBLICATIONS

Gao, P., Jiang, Y., Zhu, Y. et al. Improved cycle performance of nitrogen and phosphorus co-doped carbon coatings on lithium nickel cobalt aluminum oxide battery material. J Mater Sci 53, 9662-9673 (2018). Published Apr. 6, 2018 and Issue date Jul. 2018.*
Office Action for Korean Patent Application No. 10-2018-0147722 issued by the Korean Patent Office on Apr. 6, 2024.

* cited by examiner

*Primary Examiner* — Laura Weiner
(74) *Attorney, Agent, or Firm* — IP & T GROUP LLP

(57) ABSTRACT

A cathode active material for a lithium secondary battery includes a lithium metal oxide particle, and an organic poly-phosphate or an organic poly-phosphonate formed on at least portion of a surface of the lithium metal oxide particle. Chemical stability of the lithium metal oxide particle may be improved and surface residues may be reduced by the organic poly-phosphate or the organic poly-phosphonate.

6 Claims, 1 Drawing Sheet

CATHODE ACTIVE MATERIAL FOR LITHIUM SECONDARY BATTERY AND METHOD OF MANUFACTURING THE SAME

CROSS-REFERENCE TO RELATED APPLICATION AND CLAIM OF PRIORITY

This application is a continuation of U.S. patent application Ser. No. 16/692,895 filed on Nov. 22, 2019 which is now U.S. Pat. No. 11,502,291, which claims priority to Korean Patent Applications No. 10-2018-0147722 filed on Nov. 26, 2018 in the Korean Intellectual Property Office (KIPO), the entire disclosure of which is incorporated by reference herein.

BACKGROUND

1. Field

The present invention relates to a cathode active material for a lithium secondary battery and a method of manufacturing the same. More particularly, the present invention relates to a lithium metal oxide-based cathode active material for a lithium secondary battery and a method of manufacturing the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, the secondary battery or a battery pack including the same is being developed and applied as an eco-friendly power source of an electric automobile such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

A lithium metal oxide may be used as a cathode active material of the lithium secondary battery, and a nickel-based lithium metal oxide may be used as the lithium metal oxide.

As an application of the lithium secondary battery has been expanded, demands of more improved life-span, capacity and operation stability are increased. In the lithium metal oxide used as the cathode active material, non-uniformity of a chemical structure due to lithium precipitation may be caused, and the lithium secondary battery having desired capacity and life-span may not be obtained. Further, a structure of the lithium metal oxide may be transformed or damaged when charging and discharging operations are repeated to degrade life-span stability and capacity retention.

For example, Korean Published Patent Application No. 10-0821523 discloses a method of removing lithium salt impurities by washing a lithium complex metal oxide with water. However, the impurities may not be sufficiently removed by the method, and surface damages of cathode active material particles may be caused during the washing process.

SUMMARY

According to an aspect of the present invention, there is provided a cathode active material for a lithium secondary battery having improved operational stability and electrical property and a method of manufacturing the same.

According to an aspect of the present invention, there is provided a lithium secondary battery having improved operational stability and electrical property.

According to exemplary embodiments of the present invention, a cathode active material for a lithium secondary battery includes a lithium metal oxide particle, and an organic poly-phosphate or an organic poly-phosphonate formed on at least portion of a surface of the lithium metal oxide particle.

In some embodiments, the organic poly-phosphate is derived from an organic poly-phosphate compound represented by Structural Formula 1 below or an organic poly-phosphate salt thereof, and the organic poly-phosphonate is derived from an organic poly-phosphonate compound represented by Structural Formula 2 below or an organic poly-phosphonate salt thereof.

[Structural Formula 1]

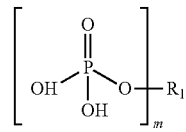

[Structural Formula 2]

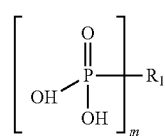

In the Structural Formulae 1 and 2 above, m may be an integer from 2 to 20, $R_1$ may represent a C1-C10 hydrocarbon group capable of substituted with a substituent group, and the substituent group may include halogen, a cyano group, a hydroxyl group, a phosphoric acid group, a carboxylic group or a salt thereof.

In some embodiments, the hydrocarbon group included in $R_1$ may be substituted or connected by at least one selected from a group consisting of a carbon-carbon double bond, —O—, —S—, —CO—, —OCO—, —SO—, —CO—O—, —O—CO—O—, —S—CO—, —S—CO—O—, —CO—NH—, —NH—CO—O—, —NR'—,

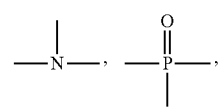

—R'OH—, —S—S— and —SO$_2$—, and R' is hydrogen or a C1-C8 alkyl group.

In some embodiments, the organic poly-phosphate compound or the organic poly-phosphonate compound may include at least one of compounds represented by Chemical Formulae 1 to 3 below.

[Chemical Formula 1]

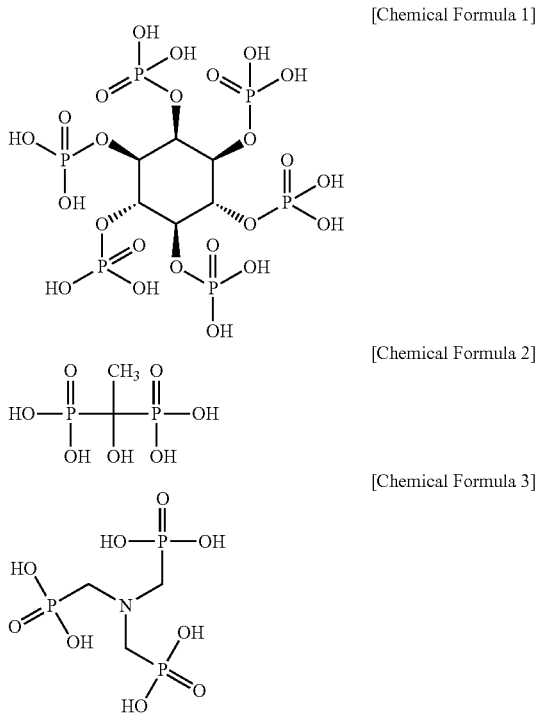

[Chemical Formula 2]

[Chemical Formula 3]

In some embodiments, the organic poly-phosphate salt or the organic poly-phosphonate salt includes a compound represented by Chemical Formula 4 below.

[Chemical Formula 4]

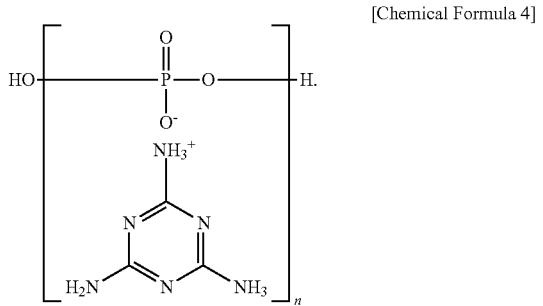

In the Chemical Formula 4 above, n may be an integer from 2 to 10.

In some embodiments, the lithium metal oxide particle includes a nickel-based lithium oxide represented by General Formula 1 below.

  [General Formula 1]

In the General Formula 1 above, 0.95≤x≤1.08, y≥0.5, and M may be at least one element selected from a group consisting of Co, Mn, Al, Zr, Ti, B, Mg and Ba.

In some embodiments, in the General Formula 1, 0.8≤y≤0.93.

In some embodiments, in the General Formula 1, M may include Co and Mn.

In some embodiments, the lithium metal oxide particle may include a doping or a coating which contains at least one of Al, Zr or Ti.

In some embodiments, the organic poly-phosphate or the organic poly-phosphonate may form a coating layer, a ligand bond or a complex bond on the surface of the lithium metal oxide particle.

In some embodiments, the lithium metal oxide particle has a layer structure, and a grain boundary at a surface portion of the lithium metal oxide particle may be coated by the organic poly-phosphate or the organic poly-phosphonate.

According to exemplary embodiments of the present invention, in a method of preparing a cathode active material for a lithium secondary battery, a lithium metal oxide particle is prepared. The lithium metal oxide particle is cleaned using a washing solution that includes an organic poly-phosphate compound or an organic poly-phosphonate compound.

In some embodiments, an adding amount of the organic poly-phosphate compound or the organic poly-phosphonate compound may be in a range from 0.1 weight percent to 2 weight percent based on a total weight of the lithium metal oxide particle.

In some embodiments, an adding amount of the organic poly-phosphate compound or the organic poly-phosphonate compound may be in a range from 0.2 weight percent to 1 weight percent based on a total weight of the lithium metal oxide particle.

In some embodiments, before cleaning the lithium metal oxide particle, the lithium metal oxide particle may be mixed and annealed with at least one of $Al_2O_3$, $ZrO_2$ or $TiO_2$.

According to exemplary embodiments of the present invention, a lithium secondary battery includes a cathode including a lithium metal oxide particle and an organic poly-phosphate or an organic poly-phosphonate formed on at least portion of a surface of the lithium metal oxide particle, an anode and a separation layer interposed between the cathode and the anode.

According to exemplary embodiments of the present invention, an organic poly-phosphate or an organic poly-phosphonate may be formed on a surface of a lithium metal oxide particle so that a metal ion complex may be formed when a layer structure of the lithium metal oxide particle is damaged. Thus, structural or crystalline stability may be enhanced compared to when an inorganic phosphoric acid or an inorganic phosphoric acid salt may be used, and stability and capacity/power output of a cathode active material may be also improved.

In exemplary embodiments, the organic poly-phosphate or the organic poly-phosphonate may be introduced by a cleaning process utilizing a washing solution. Accordingly, impurities such as lithium salt precipitates remaining on the surface of the lithium metal oxide particle may be removed while forming the organic poly-phosphate or the organic poly-phosphonate.

DETAILED DESCRIPTION OF THE EMBODIMENTS

Figure 1:
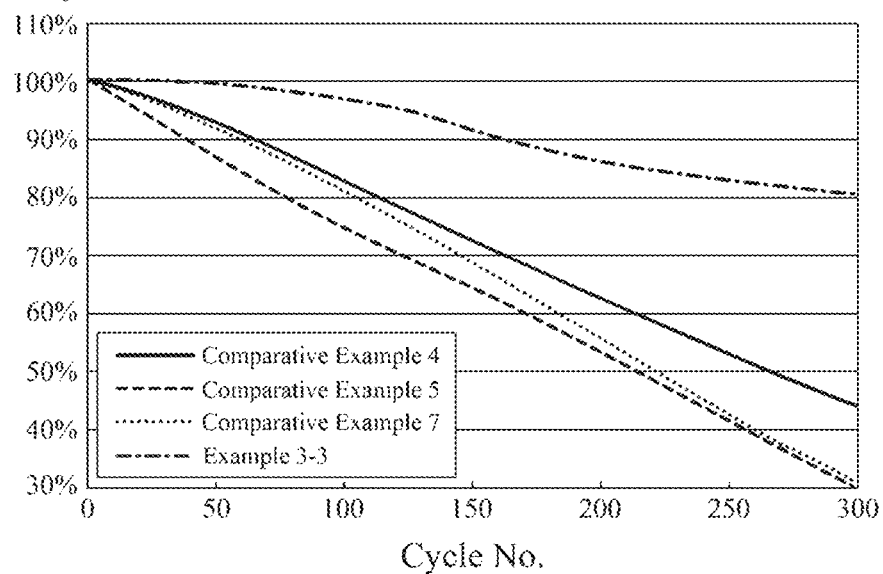
FIG. 1 is a graph showing capacity retentions of battery cells according to Example 3-3, Comparative Example 4, Comparative Example 5 and Comparative Example 7 during repeated charging/discharging operations.

<Cathode Active Material and Method of Manufacturing the Same>

A cathode active material for a lithium secondary battery (hereinafter, abbreviated as a cathode active material) according to exemplary embodiments may include a lithium metal oxide particle and an organic poly-phosphate coating or an organic poly-phosphonate coating (hereinafter, also abbreviated as an organic poly-phosphate/phosphonate coating) formed on a surface of the lithium metal oxide particle.

The term "lithium metal oxide" used herein indicates a complex oxide including lithium and at least one metal except for lithium. In exemplary embodiments, the lithium metal oxide may include a nickel-based lithium oxide.

For example, the nickel-based lithium oxide may be represented by General Formula 1 below.

$$Li_xNi_yM_{1-y}O_2 \quad \text{[General Formula 1]}$$

In the General Formula 1 above, $0.95 \leq x \leq 1.08$, $y \geq 0.5$, and M may be at least one element selected from Co, Mn, Al, Zr, Ti, B. Mg or Ba.

For example, in the lithium metal oxide of General Formula 1, nickel (Ni) may be an element related to a capacity of a lithium secondary battery. For example, as an amount of nickel becomes greater, a capacity and a power output of the lithium secondary battery may be improved.

In an embodiment, $0.8 \leq y \leq 50.93$ in General Formula 1 so that a cathode active material providing high capacity and power output may be easily obtained.

M may include cobalt (Co) and manganese (Mn) so that electrical conductivity and chemical stability may be added to a high-Ni compound. For example, cobalt (Co) may be an element related to a conductivity and a resistance of the lithium secondary battery. In an embodiment, M may include manganese (Mn), and Mn may be an element related to mechanical and electrical stability of the lithium secondary battery.

Accordingly, the lithium metal oxide particle may include a nickel-cobalt-manganese based compound, and the cathode active material having improved capacity, power output, low resistance and life-span may be provided.

In some embodiments, the lithium metal oxide particle may further include a doping element or a coating element in addition to Ni, Co and Mn. For example, the doping or coating element may include Al, Zr and/or Ti, and may preferably include Al, Zr and Ti.

In the nickel-cobalt-manganese based lithium oxide, an amount of the doping element may be in a range from about 0.1 mol % to about 1 mol % based on a total mole of Ni, Co, Mn and the doping element (e.g., Al, Zr and/or Ti), preferably in a range from about 0.5 mol % to about 1 mol %. Within the above range, chemical and structural stability of the lithium metal oxide particle may be enhanced without excessively degrading an activity of the cathode active material.

The coating element may be derived from a coating metal oxide such as $Al_2O_3$, $ZrO_2$ and/or $TiO_2$. An adding amount of the coating metal oxide for a formation of the coating may be in a range from about 0.5 wt % to about 1 wt % based on a total weight of the nickel-cobalt-manganese based lithium oxide.

In some embodiments, the lithium metal oxide particle may have a layer structure. For example, primary particles of the lithium metal oxide may be agglomerated into the layer structure to form the lithium metal oxide particle as the cathode active material. A mobility of lithium ions generated from the cathode active material may be facilitated through the particle structure.

In some embodiments, the organic poly-phosphate/phosphonate coating may be formed on the surface of the lithium metal oxide particle.

The term "organic poly-phosphate/phosphonate coating" used herein may include a coating layer formed on a substantially entire surface of the lithium metal oxide particle, and a coating layer or an island-shape layer formed on a portion of the surface of the lithium metal oxide particle.

In some embodiments, the organic poly-phosphate/phosphonate coating may include an organic ligand bond attached on the surface of the lithium metal oxide particle, or an organic-metal complex combined with a metal ion exposed on the surface of the lithium metal oxide particle.

In some embodiments, a grain boundary at a surface portion of the lithium metal oxide particle may be coated by the organic poly-phosphate/phosphonate coating.

In exemplary embodiments, the organic poly-phosphate coating may be derived from an organic poly-phosphate compound or an organic poly-phosphate salt. The organic poly-phosphonate coating may be derived from an organic poly-phosphonate compound or an organic poly-phosphonate salt.

In the present specification, the organic poly-phosphate compound may also indicate the organic poly-phosphate salt, and the organic poly-phosphonate compound may also indicate the organic poly-phosphonate salt.

In some embodiments, the organic poly-phosphate compound may include a compound represented by Structural Formula 1 below.

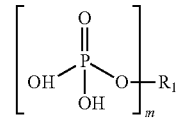

[Structural Formula 1]

In some embodiments, the organic poly-phosphonate compound may include a compound represented by Structural Formula 2 below.

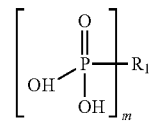

[Structural Formula 2]

In the structural Formulae 1 and 2 above, m may be an integer from 2 to 20, and $R_1$ may represent a C1-C10 hydrocarbon group capable of substituted with a substituent group. The substituent group may include halogen, a cyano group, a hydroxyl group, a phosphoric acid group, a carboxylic group or a salt thereof.

The term "hydrocarbon group" used herein may include a cyclic aliphatic group, a linear aliphatic group, an aromatic group or a combination thereof. For example, the hydrocarbon group may include an alkyl group, an alcohol group, an alkoxy group, an aryl group (e.g., C6-C10), an aryl alkoxy group (e.g., C6-C10), a cyclo alkyl group (e.g., C3-C10) or a multi-cyclic group (e.g., C5-C10).

In some embodiments, the hydrocarbon group included in $R_1$ may be substituted or connected by at least one selected from a group consisting of a carbon-carbon double bond, —O—, —S—, —CO—, —OCO—, —SO—, —CO—O—, —O—CO—O—, —S—CO—, —S—CO—O—, —CO—NH—, —NH—CO—O—, —NR'—, —R'OH—,

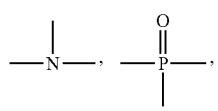

—S—S— and —SO$_2$—. R' may be hydrogen or a C1-C8 alkyl group.

In some embodiments, the organic poly-phosphate compound or the organic poly-phosphonate compound may include at least one of compounds represented by Chemical Formula 1 (inositol hexaphosphate or phytic acid), Chemical Formula 2 (etidronic acid) and Chemical Formula 3 (nitrilo-tris(methylene)triphosphonic acid).

[Chemical Formula 1]

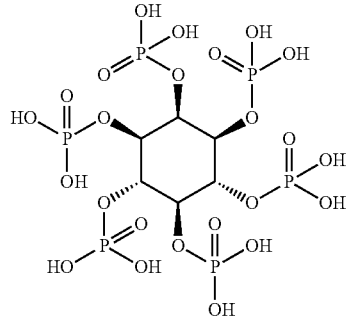

[Chemical Formula 2]

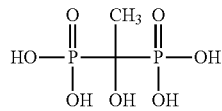

[Chemical Formula 3]

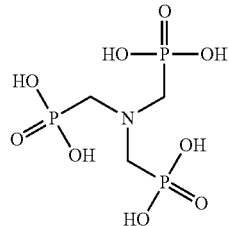

In some embodiments, the organic poly-phosphate salt or the organic poly-phosphonate salt may include a compound represented by Chemical Formula 4 below.

[Chemical Formula 4]

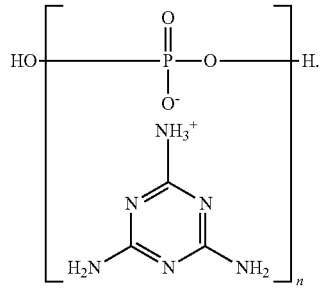

In the Chemical Formula 4 above, n may be an integer from 2 to 10.

The above mentioned organic poly-phosphate compound or the organic poly-phosphonate compound (hereinafter, abbreviated as an organic poly-phosphate/phosphonate compound) may form a ligand bond or a complex bond on the surface of the lithium metal oxide particle so that a large number of stable bonds with metal ions exposed on the surface of the lithium metal oxide particle may be formed. Thus, the surface of the lithium metal oxide particle may be protected from, e.g., a side reaction with an electrolyte effectively compared to when phosphoric acid or inorganic phosphate may be added.

For example, when phytic acid of Chemical Formula 1 may be used as the organic poly-phosphate/phosphonate compound, one molecule of phytic acid may react simultaneously with mono-valent ion such as a lithium ion, di-valent ion such as a nickel ion and tri-valent ion such as a cobalt ion or an aluminum ion to form bonds as shown in Structural Formula 3.

[Structural Formula 3]

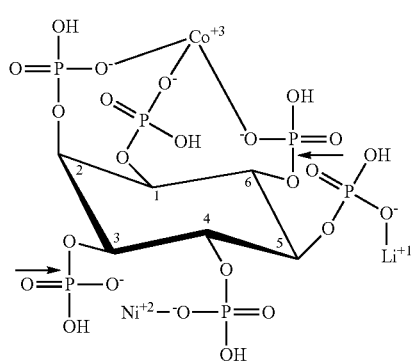

Accordingly, even when a layer structure of the lithium metal oxide particle may be transformed or damaged due to repeated charging/discharging operations, multi-bonds or multi-complexes may be formed with exposed or discharged metal ions by the organic poly-phosphate/phosphonate compound so that by-products caused by a side-reaction of the metal ions may be prevented or reduced.

Further, if the lithium metal oxide particle includes the additional doping or coating, the organic poly-phosphate/phosphonate compound may be combined with the doping or coating to further improve chemical stability of the cathode active material.

Hereinafter, a method of preparing the cathode active material will be described in more detail.

In exemplary embodiments, a lithium precursor and a nickel precursor may be reacted with each other to form the lithium metal oxide particle. The lithium precursor and the nickel precursor may include an oxide or a hydroxide of lithium and nickel, respectively. For example, the lithium precursor and the nickel precursor may be reacted in a solution by a precipitation reaction such as a co-precipitation to form a preliminary lithium metal oxide.

In some embodiments, another metal precursor (e.g., a cobalt precursor, a manganese precursor, etc.) in addition to the lithium precursor and the nickel precursor may be also reacted. In some embodiments, a nickel-cobalt-manganese precursor (e.g., a Ni—Co—Mn hydroxide) may be used together with the lithium precursor.

Another metal precursor may include a precursor of Al, Zr and/or Ti in addition to the cobalt precursor and the manganese precursor in consideration of forming the doping.

In some embodiments, after preparing the lithium metal oxide, a firing process (or a calcination process) may be further performed. For example, the firing process may be performed at a temperature in a range from about 600° C. to about 1,000° C. The layer structure of the lithium metal oxide particle may be stabilized by the firing process and the doping element may be fixed.

In some embodiments, the lithium metal oxide particle may be mixed with a metal oxide for forming a coating such as $Al_2O_3$, $ZrO_2$ and/or $TiO_2$, and then an additional annealing process may be further performed to form a coating.

In exemplary embodiments, the lithium metal oxide particle may be washed or cleaned using a washing solution that contains the organic poly-phosphate/phosphonate compound.

Non-reacted precursors may be remained or precipitated on a surface of the lithium metal oxide particle synthesized by the precursor reaction as described above. Further, impurities and solution molecules may be remained on the lithium metal oxide particle during the synthesis.

In some embodiments, an excess amount of the lithium precursor may be used for a production efficiency of the lithium metal oxide particle and a synthesis stability. In this case, lithium salt impurities including, e.g., lithium hydroxide (LiOH) and lithium carbonate ($Li_2CO_3$) may be remained on the surface of the lithium metal oxide particle.

The lithium salt impurities may be captured and removed by the organic poly-phosphate/phosphonate compound included in the washing solution. In a comparative example, when water is used in the washing solution, the lithium salt impurities may be also removed. However, an oxidation of the surface of the lithium metal oxide particle and a side reaction by water may occur to cause damages of the layer structure in the cathode active material.

However, according to exemplary embodiments, the washing process may be performed using the washing solution that includes the organic compound so that the lithium salt impurities may be effectively removed through a multi-valent structure of the organic poly-phosphate/phosphonate compound while preventing the oxidation and the layer structure damages of the particle surface.

Additionally, the organic poly-phosphate/phosphonate coating may be formed as described above during the washing process so that removal of the impurities and passivation of the particle surface may be simultaneously implemented.

In some embodiments, an amount of the organic poly-phosphate/phosphonate compound may be in a range from about 0.1 wt % to about 2 wt % based on a total weight of the lithium metal oxide particle. Within this range, sufficient coating and passivation may be achieved without an excessively degrading activity of the metal included in the cathode active material.

Preferably, the amount of the organic poly-phosphate/phosphonate compound may be in a range from about 0.2 wt % to about 1 wt % based on the total weight of the lithium metal oxide particle.

In some embodiments, the washing solution may be prepared by dissolving the organic poly-phosphate/phosphonate compound in water. In an embodiment, an organic solvent such as an alcohol-based solvent may be used in the washing solution.

In some embodiments, a drying process may be further performed after the washing process. The organic poly-phosphate/phosphonate coating may be fixed or stabilized on the particle surface by the drying process.

<Lithium Secondary Battery>

According to exemplary embodiments, a lithium secondary battery may include a cathode including the lithium metal oxide particle on which the organic poly-phosphate/phosphonate coating may be formed, an anode and a separation layer.

The cathode may include a cathode active material layer formed by coating a cathode active material that may include the lithium metal oxide particle on a cathode current collector.

For example, the lithium metal oxide particle may be mixed and stirred together with a binder, a conductive agent and/or a dispersive agent in a solvent to form a slurry. The slurry may be coated on the cathode current collector, and pressed and dried to obtain the cathode.

The cathode current collector may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power output of the lithium secondary battery may be further improved.

The conductive agent may be added to facilitate an electron mobility between the active material particles. For example, the conductive additive may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

The anode may include an anode current collector and an anode active material layer formed by coating an anode active material on the anode current collector.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector may include gold, stainless-steel, nickel, aluminum, titanium, copper or an alloy thereof, preferably, may include copper or a copper alloy.

In some embodiments, the anode active material may be mixed and stirred together with a binder, a conductive agent and/or a dispersive agent in a solvent to form a slurry. The slurry may be coated on the anode current collector, and pressed and dried to obtain the anode.

The binder and the conductive agent substantially the same as or similar to those as mentioned above may be used. In some embodiments, the binder for the anode may include an aqueous binder such as such as styrene-butadiene rubber (SBR) that may be used with a thickener such as carboxymethyl cellulose (CMC) so that compatibility with the carbon-based active material may be improved.

The separation layer may be interposed between the cathode and the anode. The separation layer may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer may be also formed from a non-woven fabric including a glass fiber with a high melting point, a polyethylene terephthalate fiber, or the like.

In exemplary embodiments, an electrode cell may be defined by the cathode, the anode and the separation layer, and a plurality of the electrode cells may be stacked to form an electrode assembly having, e.g., a jelly roll shape. For example, the electrode assembly may be formed by winding, laminating or folding of the separation layer.

The electrode assembly may be accommodated in an outer case together with an electrolyte to form the lithium secondary battery. In example embodiments, the electrolyte may include a non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$; $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

An electrode tab may be formed from each of the cathode current collector and the anode current collector to extend to one end of the outer case. The electrode tabs may be welded together with the one end of the outer case to form an electrode lead exposed at an outside of the outer case.

The lithium secondary battery may be fabricated into a cylindrical shape using a can, a prismatic shape, a pouch shape, a coin shape, etc.

According to exemplary embodiments, chemical stability of the cathode active material may be enhanced by the organic poly-phosphate/phosphonate coating so that life-span and long-term stability of the lithium secondary battery may be improved while suppressing a reduction of a capacity and an average voltage.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

In Examples and Comparative Examples, lithium metal oxide particles having compositions as shown in Table 1 below ($Li[Ni_{0.88}Co_{0.09}Mn_{0.03}]O_2$ or $Li[Ni_{0.8}Co_{0.1}Mn_{0.1}]O_2$) were prepared.

Specifically, a lithium hydroxide as a lithium precursor and a nickel-cobalt-manganese hydroxide as a complex metal precursor having a molar ratio corresponding to that shown in Table 1 were uniformly mixed by a molar ratio of 1.05:1 to form a mixture. The mixture was input in a firing chamber, oxygen was provided at a flow rate of 10 mL/min while heating to a temperature between 700° C. and 800° C. at a rate of 2° C./min, and the mixture was maintained in the firing chamber for 10 hours at the temperature. After the firing, the mixture was cooled to room temperature, and then grinded and distributed to obtain the lithium metal oxide particle as a cathode active material.

Examples

Organic poly-phosphate/phosphonate compounds as listed in Table 1 were input 100 mL of pure water having a resistivity of 20 MΩcm or less to prepare a washing solution. The lithium metal oxide particles were input in the washing solution, stirred for 10 minutes and filtrated. The filtrated lithium metal oxide particles were vacuum-dried at a temperature of 250° C. for 12 hours to obtain desired lithium metal oxides.

Comparative Examples

In Comparative Examples 1 to 4, processes the same as those of Examples were performed except that pure water having a resistivity of 20 MΩcm or less was only used as a washing solution.

In Comparative Examples 5 and 6, processes the same as those of Examples were performed except that phosphoric acid or an inorganic phosphoric acid salt was used instead of the organic poly-phosphate/phosphonate compounds.

In Comparative Example 7, processes the same as those of Examples were performed except that ammonium polyphosphate devoid of carbon was used instead of the organic poly-phosphate/phosphonate compounds.

TABLE 1

| | Lithium Metal Oxide Particle | Dopant (M) amount M/(Ni + Co + Mn + M) | | | Coating Amount (wt %) | | | | |
|---|---|---|---|---|---|---|---|---|---|
| | | Al | Zr | Ti | $Al_2O_3$ | $ZrO_2$ | $TiO_2$ | Added Compound | wt % |
| Example 1-1 | $Li[Ni_{0.88}Co_{0.09}Mn_{0.03}]O_2$ | | | | | | | Inositol hexaphosphate | 0.5 |
| Example 1-2 | $Li[Ni_{0.88}Co_{0.09}Mn_{0.03}]O_2$ | | | | | | | etidronic acid | 0.5 |
| Example 1-3 | $Li[Ni_{0.88}Co_{0.09}Mn_{0.03}]O_2$ | | | | | | | Nitrilotris(methylene) triphosphonic acid | 0.5 |
| Example 1-4 | $Li[Ni_{0.88}Co_{0.09}Mn_{0.03}]O_2$ | | | | | | | Trimethylamine triphosphate | 0.5 |

TABLE 1-continued

| | Lithium Metal Oxide Particle | Dopant (M) amount M/(Ni + Co + Mn + M) Al | Zr | Ti | Coating Amount (wt %) Al$_2$O$_3$ | ZrO$_2$ | TiO$_2$ | Added Compound | wt % |
|---|---|---|---|---|---|---|---|---|---|
| Example 2-1 | Li[Ni$_{0.88}$Co$_{0.09}$Mn$_{0.03}$]O$_2$ | | | | | | | Inositol hexaphosphate | 2.0 |
| Example 2-2 | Li[Ni$_{0.88}$Co$_{0.09}$Mn$_{0.03}$]O$_2$ | | | | | | | Inositol hexaphosphate | 1.0 |
| Example 2-3 | Li[Ni$_{0.88}$Co$_{0.09}$Mn$_{0.03}$]O$_2$ | | | | | | | Inositol hexaphosphate | 0.2 |
| Example 2-4 | Li[Ni$_{0.88}$Co$_{0.09}$Mn$_{0.03}$]O$_2$ | | | | | | | Inositol hexaphosphate | 0.1 |
| Example 3-1 | Li[Ni$_{0.88}$Co$_{0.09}$Mn$_{0.03}$]O$_2$ | 0.3 | 0.2 | 0.2 | | | | Inositol hexaphosphate | 0.5 |
| Example 3-2 | Li[Ni$_{0.88}$Co$_{0.09}$Mn$_{0.03}$]O$_2$ | 0.3 | 0.2 | 0.2 | | | | Nitrilotris(methylene) triphosphonic acid | 0.5 |
| Example 3-3 | Li[Ni$_{0.88}$Co$_{0.09}$Mn$_{0.03}$]O$_2$ | | | | 0.5 | 0.06 | 0.2 | Inositol hexaphosphate | 0.5 |
| Example 3-4 | Li[Ni$_{0.88}$Co$_{0.09}$Mn$_{0.03}$]O$_2$ | | | | 0.5 | 0.06 | 0.2 | Nitrilotris(methylene) triphosphonic acid | 0.5 |
| Example 4-1 | Li[Ni$_{0.8}$Co$_{0.1}$Mn$_{0.1}$]O$_2$ | | | | | | | Inositol hexaphosphate | 0.5 |
| Example 4-2 | Li[Ni$_{0.8}$Co$_{0.1}$Mn$_{0.1}$]O$_2$ | | | | | | | Nitrilotris(methylene) triphosphonic acid | 0.5 |
| Example 4-3 | Li[Ni$_{0.8}$Co$_{0.1}$Mn$_{0.1}$]O$_2$ | 0.3 | 0.2 | 0.2 | | | | Inositol hexaphosphate | 0.5 |
| Example 4-4 | Li[Ni$_{0.8}$Co$_{0.1}$Mn$_{0.1}$]O$_2$ | 0.3 | 0.2 | 0.2 | | | | Nitrilotris(methylene) triphosphonic acid | 0.5 |
| Example 4-5 | Li[Ni$_{0.8}$Co$_{0.1}$Mn$_{0.1}$]O$_2$ | | | | 0.5 | 0.06 | 0.2 | Inositol hexaphosphate | 0.5 |
| Example 4-6 | Li[Ni$_{0.8}$Co$_{0.1}$Mn$_{0.1}$]O$_2$ | | | | 0.5 | 0.06 | 0.2 | Nitrilotris(methylene) triphosphonic acid | 0.5 |
| Comparative Example 1 | Li[Ni$_{0.88}$Co$_{0.09}$Mn$_{0.03}$]O$_2$ | | | | | | | none | |
| Comparative Example 2 | Li[Ni$_{0.8}$Co$_{0.1}$Mn$_{0.1}$]O$_2$ | | | | | | | none | |
| Comparative Example 3 | Li[Ni$_{0.88}$Co$_{0.09}$Mn$_{0.03}$]O$_2$ | 0.3 | 0.2 | 0.2 | | | | none | |
| Comparative Example 4 | Li[Ni$_{0.88}$Co$_{0.09}$Mn$_{0.03}$]O$_2$ | | | | 0.5 | 0.06 | 0.2 | none | |
| Comparative Example 5 | Li[Ni$_{0.88}$Co$_{0.09}$Mn$_{0.03}$]O$_2$ | | | | 0.5 | 0.06 | 0.2 | H$_3$PO$_4$ | 0.5 |
| Comparative Example 6 | Li[Ni$_{0.88}$Co$_{0.09}$Mn$_{0.03}$]O$_2$ | | | | 0.5 | 0.06 | 0.2 | Li$_3$PO$_4$ | 0.5 |
| Comparative Example 7 | Li[Ni$_{0.88}$Co$_{0.09}$Mn$_{0.03}$]O$_2$ | | | | 0.5 | 0.06 | 0.2 | ammonium polyphosphate | 0.5 |

Experiment Example (1) Measurement of Remaining Lithium Salt Impurities 5.0 g of each lithium metal oxide particle according to Examples and Comparative Examples was quantified in a 250 mL flask with 100 g of deionized water, and then a magnetic bar was put and stirred for 10 minutes at a rate of 4 rpm. The mixture was filtered using a pressure reducing flask and 50 g of the mixture was collected. The collected mixture was automatically titrated with 0.1N HCl in an auto titrator to measure amounts of LiOH and Li$_2$CO$_3$ as shown in Table 2 below.

(2) Evaluation of Battery Properties 2-1) Fabrication of Secondary Battery Cell

Each lithium metal oxide particles of Examples and Comparative Examples, carbon black as a conductive additive and PVDF as a binder were mixed by a weight ratio of 92:5:3 to form a slurry. The slurry was uniformly coated on an aluminum foil having a thickness of 15 μm and vacuum-dried at 130° C. to form a cathode for a lithium secondary battery. An electrode assembly was formed using the cathode, a lithium foil as a counter electrode, a porous polyethylene layer (thickness: 21 μm) as a separator. A battery cell having a coin half cell shape was fabricated by a commonly known process using the electrode assembly and an electrolyte solution in which 1.0 M of LiPF6 was dissolved in a solution including ethylene carbonate and ethyl methyl carbonate by a volume ratio of 3:7.

2-2) Measurement of Initial Charging/Discharging Capacity

One cycle of a charging (CC/CV 0.1C 4.3V 0.05CA CUT-OFF) and a discharging (CC 0.1C 3.0V CUT-OFF) was performed to the battery cells of Examples and Comparative Examples, and initial charging and discharging capacities were measured (CC: constant current, CV: Constant voltage)

2-3) Measurement of Initial Efficiency

The initial discharging capacity measured in the above 2-2) was denominated by an initial charging capacity to measure an initial efficiency as a percentage value.

2-4) Measurement of Capacity Retention 300 cycles of a charging (CC/CV 0.5C 4.3V 0.05CA CUT-OFF) and a discharging (CC 1.0C 3.0V CUT-OFF) were repeated using the battery cells of Examples and Comparative Examples. A discharging capacity at the 300th cycle was denominated by the discharging capacity at the first cycle to measure a capacity retention ratio as a percentage value.

The results are shown in Table 2 below.

TABLE 2

|  | LiOH wt % | Li2CO3 wt % | Initial Charging Capacity mAh/g | Initial Discharging Capacity mAh/g | Initial Effciency % | Capacity Retention % |
|---|---|---|---|---|---|---|
| Example 1-1 | 0.211 | 0.401 | 240 | 214 | 89 | 65 |
| Example 1-2 | 0.232 | 0.374 | 242 | 216 | 89 | 61 |
| Example 1-3 | 0.200 | 0.412 | 243 | 213 | 88 | 63 |
| Example 1-4 | 0.251 | 0.392 | 240 | 210 | 88 | 58 |
| Example 2-1 | 0.233 | 0.444 | 230 | 211 | 92 | 63 |
| Example 2-2 | 0.201 | 0.399 | 239 | 214 | 90 | 65 |
| Example 2-3 | 0.222 | 0.309 | 238 | 214 | 90 | 63 |
| Example 2-4 | 0.218 | 0.281 | 238 | 214 | 90 | 61 |
| Example 3-1 | 0.205 | 0.390 | 236 | 212 | 90 | 78 |
| Example 3-2 | 0.222 | 0.379 | 238 | 211 | 89 | 73 |
| Example 3-3 | 0.197 | 0.382 | 238 | 215 | 90 | 80 |
| Example 3-4 | 0.231 | 0.309 | 237 | 210 | 89 | 79 |
| Example 4-1 | 0.123 | 0.384 | 226 | 199 | 88 | 73 |
| Example 4-2 | 0.189 | 0.355 | 228 | 198 | 87 | 70 |
| Example 4-3 | 0.175 | 0.361 | 220 | 200 | 91 | 82 |
| Example 4-4 | 0.19 | 0.400 | 226 | 201 | 89 | 80 |
| Example 4-5 | 0.181 | 0.349 | 222 | 202 | 91 | 82 |
| Example 4-6 | 0.209 | 0.412 | 224 | 202 | 90 | 78 |
| Comparative Example 1 | 0.121 | 0.192 | 243 | 211 | 87 | 28 |
| Comparative Example 2 | 0.111 | 0.198 | 228 | 201 | 88 | 33 |
| Comparative Example 3 | 0.183 | 0.194 | 240 | 208 | 87 | 43 |
| Comparative Example 4 | 0.211 | 0.256 | 240 | 211 | 87 | 45 |
| Comparative Example 5 | 0.071 | 0.638 | 247 | 201 | 81 | 30 |
| Comparative Example 6 | 0.301 | 0.987 | 245 | 215 | 88 | 62 |
| Comparative Example 7 | 0.089 | 0.591 | 236 | 205 | 87 | 31 |

Referring to Table 2 above, when the washing process using the organic poly-phosphate/phosphonate compound was performed, an amount of lithium impurities was decreased and improved charging/discharging efficiency and capacity retention were obtained.

In Comparative Examples 1 to 4 in which water was only used in the washing process, the lithium impurities were effectively removed, but efficiency and capacity retention were degraded due to an oxidation of a particle structure.

FIG. 1 is a graph showing discharge capacity retentions of battery cells according to Example 3-3, Comparative Example 4, Comparative Example 5 and Comparative Example 7 during repeated charging/discharging operations.

Referring to FIG. 1, remarkably improved capacity retention was obtained from Example 3-3 in which the washing process using the organic poly-phosphate/phosphonate compound was performed compared to those from Comparative Examples.

(3) Surface Analysis

A surface of the lithium metal oxide particle prepared by Example 3-3 in which the washing process using the organic poly-phosphate/phosphonate compound was performed was analyzed by a time of flight secondary ion mass spectroscopy (TOF-SIMS) method. Specifically, a $Bi^{3+}$ ion gun was used by a TOF-SIMS V (ION-TOF GmbH, Germany) apparatus equipped with a Bi ion gun, and a analyzing area was 50×50 μm².

Figure 2:
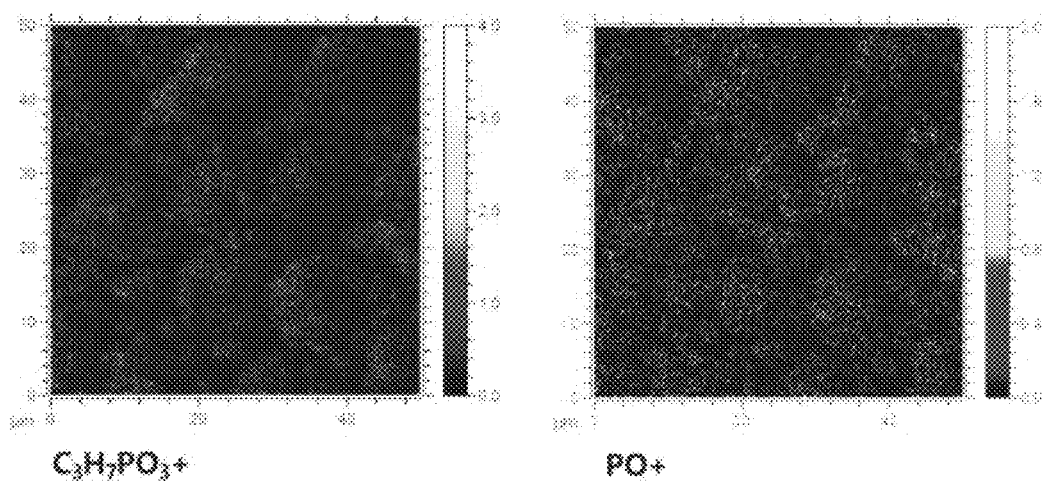
FIG. 2 is a TOF-SIMS analysis image of a surface of a lithium metal oxide particle according to Example 3-3.

FIG. 2 is a TOF-SIMS analysis image of a surface of a lithium metal oxide particle according to Example 3-3.

As shown in FIG. 2, ion fragment peaks generated from the organic poly-phosphate compound such as CxHyPO3+ and PO+ peaks uniformly distributed on the particle surface of Example 3-3 were detected.

What is claimed is:

1. A method of preparing a cathode active material for a lithium secondary battery, comprising:
   preparing a lithium metal oxide particle; and
   cleaning the lithium metal oxide particle using a washing solution that includes an organic poly-phosphate compound or an organic poly-phosphonate compound,
   wherein the cathode active material comprises the lithium metal oxide particle and a coating layer including the organic poly-phosphate compound or the organic poly-phosphonate compound,
   wherein the organic poly-phosphate is represented by Structural Formula 1 below, and the organic poly-phosphonate is represented by Structural Formula 2 below:

[Structural Formula 1]

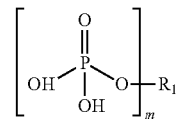

[Structural Formula 2]

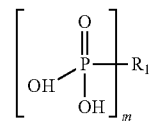

wherein, in the Structural Formulae 1 and 2 above, m is an integer from 2 to 20, and R1 represents an unsubstituted C1-C10 hydrocarbon group or a $C_1$-$C_{10}$ hydrocarbon group substituted with a substituent group, and the substituent group includes halogen, a cyano group, a hydroxyl group, a phosphoric acid group, a carboxylic group or a salt thereof.

2. The method according to claim 1, wherein the lithium metal oxide particle includes a nickel-based lithium oxide represented by General Formula 1 below:

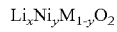  [General Formula 1]

wherein, in the General Formula 1 above, $0.95 \leq x \leq 1.08$, $0.5 \leq y \leq 1$, and M is at least one element selected from a group consisting of Co, Mn, Al, Zr, Ti, B, Mg and Ba.

3. The method according to claim 1, wherein an amount of the organic poly-phosphate compound or the organic poly-phosphonate compound is in a range from 0.1 weight percent to 2 weight percent based on a total weight of the lithium metal oxide particle.

4. The method according to claim 1, wherein an amount of the organic poly-phosphate compound or the organic poly-phosphonate compound is in a range from 0.2 weight percent to 1 weight percent based on a total weight of the lithium metal oxide particle.

5. The method according to claim 1, further comprising, before cleaning the lithium metal oxide particle, mixing and annealing the lithium metal oxide particle with at least one of $Al_2O_3$, $ZrO_2$ or $TiO_2$.

6. A method of preparing a cathode active material for a lithium secondary battery, comprising:
    preparing a lithium metal oxide particle; and
    cleaning the lithium metal oxide particle using a washing solution that includes an organic poly-phosphate compound or an organic poly-phosphonate compound,
    wherein the cathode active material comprises the lithium metal oxide particle and a coating layer including the organic poly-phosphate compound or the organic poly-phosphonate compound, wherein the organic poly-phosphate is represented by Structural Formula 1 below, and the organic poly-phosphonate is represented by Structural Formula 2 below:

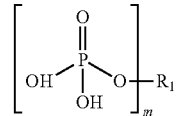  [Structural Formula 1]

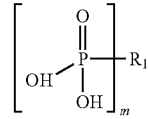  [Structural Formula 2]

wherein, in the Structural Formulae 1 and 2 above, m is an integer from 2 to 20, and R1 represents a $C_1$-$C_{10}$ hydrocarbon group substituted with a substituent group, and the substituent group includes at least one selected from a group consisting of a carbon-carbon double bond, —O—, —S—, —CO—, —OCO—, —SO—, —CO—O—, —O—CO—O—, —S—CO—, —S—CO—O—, —CO—NH—, —NH—CO—O—, —NR'—,

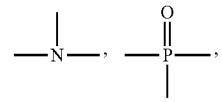

—R'OH—, —S—S— and —SO$_2$—, and R' is hydrogen or a $C_1$-$C_8$ alkyl group.

* * * * *